US010420000B2

(12) United States Patent
Qin

(10) Patent No.: US 10,420,000 B2
(45) Date of Patent: Sep. 17, 2019

(54) COMMUNICATION APPARATUS AND COMMUNICATION METHOD

(71) Applicant: SONY CORPORATION, Tokyo (JP)

(72) Inventor: Zhongbin Qin, Beijing (CN)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/495,292

(22) Filed: Apr. 24, 2017

(65) Prior Publication Data
US 2017/0230884 A1 Aug. 10, 2017

Related U.S. Application Data

(62) Division of application No. 14/982,394, filed as application No. PCT/CN2014/079934 on Jun. 16, 2014, now Pat. No. 9,681,353.

(30) Foreign Application Priority Data

Jun. 18, 2013 (CN) .......................... 2013 1 0240852

(51) Int. Cl.
H04W 36/30 (2009.01)
H04W 36/00 (2009.01)
H04W 36/02 (2009.01)
H04W 36/08 (2009.01)
H04W 74/08 (2009.01)
H04W 36/18 (2009.01)

(52) U.S. Cl.
CPC ....... *H04W 36/30* (2013.01); *H04W 36/0083* (2013.01); *H04W 36/023* (2013.01); *H04W 36/08* (2013.01); *H04W 36/18* (2013.01); *H04W 74/0833* (2013.01)

(58) Field of Classification Search
CPC ............. H04W 36/30; H04W 36/0083; H04W 36/023; H04W 36/08; H04W 36/18
See application file for complete search history.

(56) References Cited

U.S. PATENT DOCUMENTS

| 7,876,729 | B1 | 1/2011 | Grilli et al. |
| 2004/0147262 | A1 | 7/2004 | Lescuyer |
| 2008/0095133 | A1 | 4/2008 | Kodo et al. |
| 2009/0088159 | A1 | 4/2009 | Wu |

(Continued)

FOREIGN PATENT DOCUMENTS

| CN | 1905730 A | 1/2007 |
| WO | WO 2008/049966 A1 | 5/2008 |

OTHER PUBLICATIONS

International Search Report dated Aug. 20, 2014, in PCT/CN2014/079934 filed Jun. 16, 2014.

(Continued)

*Primary Examiner* — Albert T Chou
(74) *Attorney, Agent, or Firm* — Xsensus LLP

(57) ABSTRACT

An electronic device including processing circuitry configured to establish a first wireless communication channel with a user equipment (UE). The device also determines whether a second communication channel of at least a predetermined quality exists between the UE and a non co-baseband basestation (BS) while the first communication channel between the UE and the electronics device is maintained. The first communication channel and the second communication channel use different carrier resources.

20 Claims, 16 Drawing Sheets

(56) References Cited

U.S. PATENT DOCUMENTS

| | | | |
|---|---|---|---|
| 2009/0143016 A1 | 6/2009 | Li | |
| 2010/0177739 A1 | 7/2010 | Huang | |
| 2011/0292821 A1 | 12/2011 | Chin | |
| 2012/0002643 A1 | 1/2012 | Chung et al. | |
| 2012/0028644 A1 | 2/2012 | Li | |
| 2012/0275394 A1* | 11/2012 | Gunnarsson | H04W 72/082 370/329 |
| 2013/0028236 A1 | 1/2013 | Jung et al. | |
| 2013/0107862 A1 | 5/2013 | Yang et al. | |
| 2015/0341156 A1* | 11/2015 | Yang | H04W 52/146 370/280 |
| 2016/0029401 A1* | 1/2016 | Fukuta | H04W 72/1205 370/329 |
| 2017/0318577 A1* | 11/2017 | Yang | H04W 72/042 |

OTHER PUBLICATIONS

Written Opinion of the International Searching Authority dated Aug. 20, 2014, in PCT/CN2014/079934 filed Jun. 16, 2014.
Extended Search Report issued in European Application 18174062. 2-1214 dated Sep. 17, 2018.
Broadcom Corporation, "Mobility for Dual Connectivity", 3GPP Draft; R2-130990 Mobility for Dual Connectivity, 3rd Generation Partnership Project (3GPP), 3GPP TSG RAN WG2 Meeting #81 bis, 7 Pages total, (Apr. 15-19, 2013).

* cited by examiner

COMMUNICATION APPARATUS AND COMMUNICATION METHOD

CROSS REFERENCE TO RELATED APPLICATION

The present application is a divisional of U.S. application Ser. No. 14/892,394, filed on Nov. 19, 2015, which was the National Stage of International Application No. PCT/CN2014/079934, filed on Jun. 16, 2014, which claimed priority to Chinese Application No. 201310240852.3, filed on Jun. 18, 2013. The entire contents of all of which are hereby incorporated by reference in its entirety.

FIELD OF THE INVENTION

The disclosure generally relates to a communication technical field, in particular to a communication apparatus and a communication method. More specifically, the disclosure relates to a communication apparatus and a communication method for changing the communication between base stations and a communication terminal.

BACKGROUND OF THE INVENTION

In communication techniques such as a Long-Term Evolution (-Advanced) technique, there is a method for changing a base station which communicates with a communication terminal. Generally, in base station handover, it needs to disconnect the connection between a communication terminal and the original base station (i.e., the source base station) and to establish a connection with a new base station (i.e., destination base station). Of course, there is also a technique of soft handing over the communication terminal in the prior art, wherein the communication terminal temporarily connects with two base stations in the handover, and disconnects the connection with the source base station after establishing a stable communication with the destination base station, thereby achieving a seamless handover technique.

SUMMARY OF THE INVENTION

In one embodiment an electronic device is described that includes processing circuitry configured to establish a first wireless communication channel with a user equipment (UE). The device also determines whether a second communication channel of at least a predetermined quality exists between the UE and a non co-baseband basestation (BS) while the first communication channel between the UE and the electronics device is maintained. The first communication channel and the second communication channel use different carrier resources.

In another embodiment, a communications method is described that establishes a first wireless communication channel between a first basestation and a user equipment (UE); determining with processing circuitry whether a second communication channel of at least predetermined quality exists between the UE and a non co-baseband BS while the first communication channel between the UE and the electronics device is maintained, wherein the first communication channel and the second communication channel use different carrier resources.

In a non-transitory computer readable storage device embodiment, the device has instructions stored therein that when executed by processing circuitry perform a communications method, the method comprising: establishing a first wireless communication channel between a first basestation and a user equipment (UE); determining with the processing circuitry whether a second communication channel of at least predetermined quality exists between the UE and a non co-baseband BS while the first communication channel between the UE and the electronics device is maintained, wherein the first communication channel and the second communication channel use different carrier resources.

BRIEF DESCRIPTION OF THE DRAWINGS

The above and other objects, features and advantages of the disclosure may be obvious by referring to the subject matter of the invention and the description of the embodiments thereof in conjunction with the Drawings. In the Drawings.

DETAILED DESCRIPTION OF THE INVENTION

Figure 1:
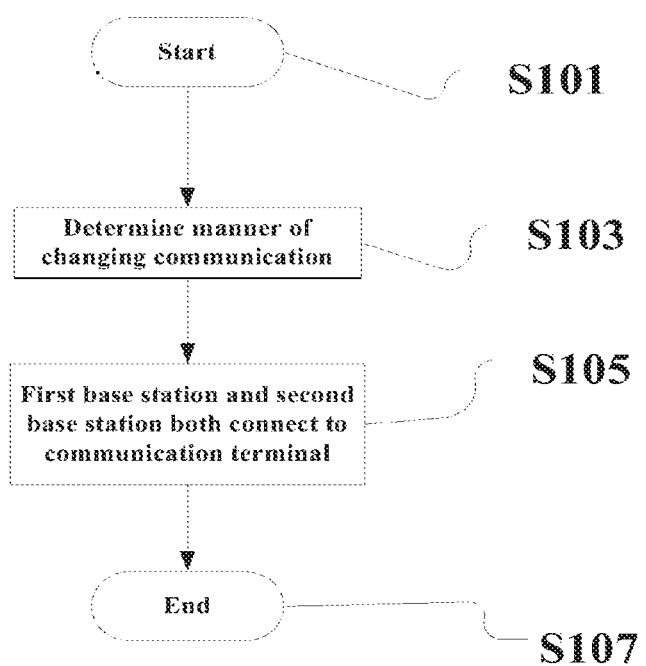
FIG. 1 is a flowchart illustrating a communication method according to a first embodiment of the disclosure.

Embodiments of the disclosure will be described below in conjunction with the Figures.

The description will be made in the following order.
1. First embodiment of the disclosure
2. Second embodiment of the disclosure
3. Third embodiment of the disclosure
4. Fourth embodiment of the disclosure
5. Fifth embodiment of the disclosure
6. Sixth embodiment of the disclosure

1. First Embodiment of the Disclosure

Hereinafter, the first embodiment of the disclosure will be described in conjunction with FIGS. 1, and 10.

Figure 10:
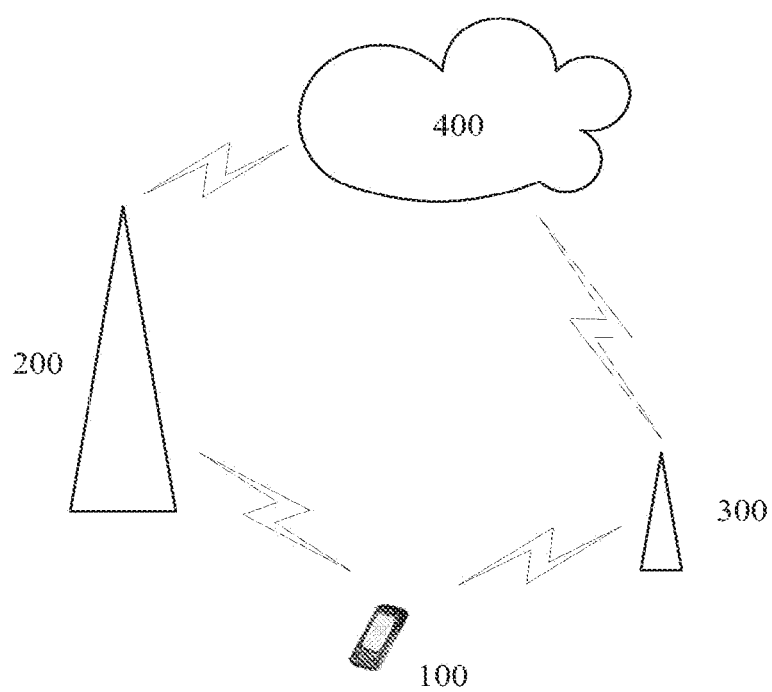
FIG. 10 is a schematic diagram illustrating a situation related to a communication method for changing a base station which is communicating with a communication terminal.

Firstly, FIG. 10 illustrates a situation related to a communication method for changing a base station communicating with a communication terminal.

In the system shown in FIG. 10, a communication terminal 100 may connect to a core network 400 through not only a first base station 200 but also a second station 300, and may also connect to the core network 400 through both of the first base station 200 and the second station 300 simultaneously.

It should be noted that the first base station 200 and the second station 300 may connect to the core network 400 through the same gateway or different gateways. Herein, the core network 400 may be Internet, an intranet, or other suitable network.

It should be noted that the first base station 200 shown in FIG. 10 may be a macro base station, and the second base station 300 may be a micro base station. However, the first base station 200 and the second station 300 may be base stations of other suitable type. As for the embodiment of the invention, the coverage of the first base station 200 and the coverage the second station 300 overlap. Preferably, the coverage the second station 300 is contained in the coverage of the first base station 200.

The first base station 200 and the second station 300 may operate according to the same protocol or different protocols. The protocols of the first base station 200 and the second station 300 may be appropriately selected from the following LTE(-A) FDD (Frequency Division Duplex), LTE (-A) TDD (Time Division Duplex), WiFi (Wireless Fidelity), WCDMA/TD-SCDMA/HSPA/HSPA+ (Wideband Code Division Multiple Access/Time Division-Synchronous Code Division Multiple Access/High Speed Package Access/High Speed Package Access+), CDMA/EV-DO (Code Division Multiple Access/Evolution-Data Only), WiMAX (World Interoperability for Microwave Access).

FIG. 1 illustrates a communication method according to a first embodiment of the disclosure, which is used for changing a base station communicating with a communication terminal. The communication method begins at step S101, and proceeds to step S103.

At step S103, when a communication terminal 100 is communicating with a first base station 200, the manner of changing the communication between the first base station 200 and the communication terminal 100 and the communication between a second base station 300 and the communication terminal 100 is determined, at least based on a measuring result of signals of the second base station 300 from the communication terminal 100. Then the process proceeds to Step S105.

It should be noted that the frequency bands of the first base station 200 and the second base station 300 are different. Therefore, when the communication terminal 100 communicates with both of the first base station 200 and the second base station 300, a more frequency band can be obtained.

At step S105, in the case that the measuring result meets a predetermined condition, the first base station 200 and the second base station 300 both perform data transmission connection with the communication terminal 100 on different carrier resources.

The predetermined condition may be set according to the practical situation. For example, when the communication terminal 100 can not obtain a required frequency band through only connecting with the first base station 200 or only connecting with the second base station 300, it needs the communication terminal 100 to connect with both of the first base station 200 and the second base station 300. Or, when a part of traffic of the communication terminal 100 is adapted to communicate through the first base station 200 and another part of traffic of the communication terminal 100 is adapted to communicate through the second base station 300, it also needs the communication terminal 100 to connect with both of the first base station 200 and the second base station 300.

Then the process proceeds to step S107 and ends the process at step S107.

Hereinafter, the signaling interaction performed on a control plane by the communication method according to the first embodiment of the disclosure will be described in conjunction with FIG. 2. It should be noted that the communication method according to the first embodiment of the disclosure may be performed by a manner other than the manner shown in FIG. 2, and the manner shown in FIG. 2 is only illustrative.

Figure 2:
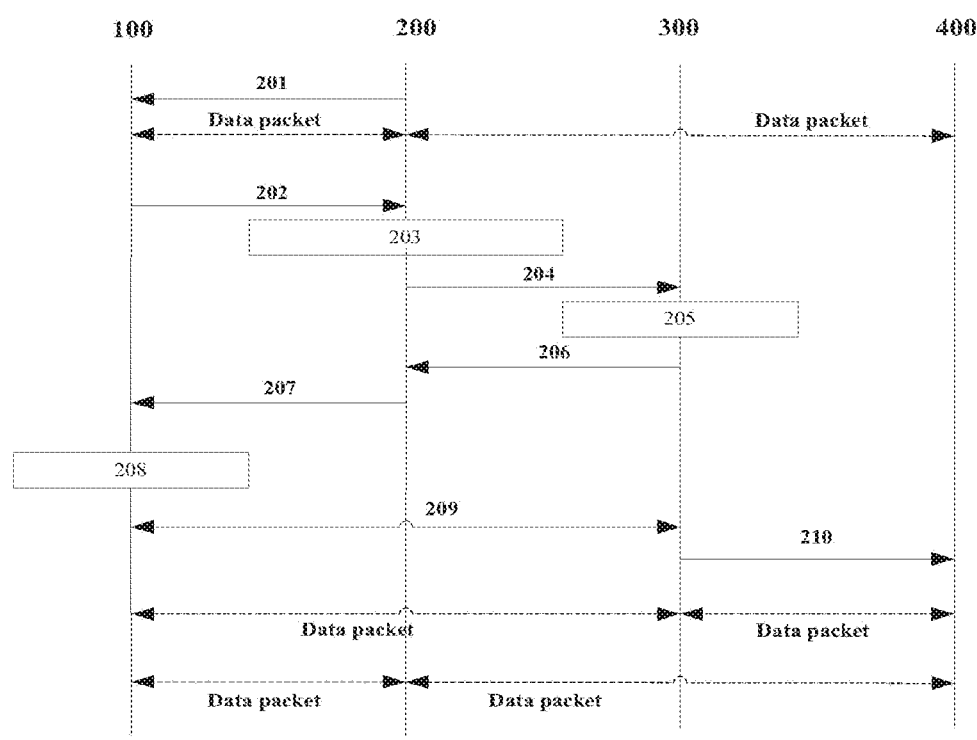
FIG. 2 is a schematic diagram illustrating the signaling interaction in communication method according to the first embodiment of the disclosure.

In FIG. 2, the signaling interaction between the communication terminal 100, the first base station 200, the second base station 300 and the core network 400 is schematically illustrated.

Firstly, the first base station 200 sends control information for measuring a signal of the second base station 300 to the communication terminal 100 (201). It should be noted that at this time the uplink and downlink data packets are only transmitted between the communication terminal 100 and the first base station 200 and between the first base station 200 and the core network 400. The data packet herein may be an IP (Internet protocol) data packet.

In response to the control information sent by the first base station 200, the communication terminal 100 sends a measuring result to the first base station 200 (202).

After receiving the measuring result fed back by the communication terminal 100, the first base station 200 determines whether the first base station 200 and the second base station 300 both perform data transmission connection with the communication terminal 100 on different carrier resources.

If the measuring result meets a predetermined condition, the first base station 200 and the second base station 300 both perform data transmission connection with the communication terminal 100 on different carrier resources.

Wherein, if the first base station 200 and the second base station 300 share baseband, the first base station 200 and the second base station 300 directly connect to each other through optical fiber and the signal communication there between hardly has a delay. Therefore the first base station 200 and the second base station 300 both may connect with the communication terminal 100 in a manner of carrier aggregation in the same base station. That is, other secondary carriers is dispatched through one primary carrier, and the communication between the first base station 200 and the communication terminal 100 and the communication between the second base station 300 and the communication terminal 100 has a common control plane configuration, such as a Radio Resource Control (RRC) protocol configuration of the LIE. For example, one communication carrier between the first base station 200 and the communication terminal 100 may serve as the primary carrier, and communication carriers between the second base station 300 and the communication terminal 100 may server as the secondary carriers (the secondary carriers may also include other communication carriers between the first base station 200 and the communication terminal 100), and respective secondary carriers may be dispatched through the primary carrier.

In addition, in the case that the first base station 200 and the second base station 300 do not share baseband, the communication between the first base station 200 and the second base station 300 needs to be performed through a bone network other than an optical fiber direct connection and has a larger delay. It is difficult for the communication carriers between the first base station 200 and the communication terminal 100 to dispatch the communication carriers between the second base station 300 and the communication terminal 100. Therefore the first base station 200 and the second base station 300 both may connect with the communication terminal 100 in a manner other that the manner of carrier aggregation in the same base station.

In the case that the first base station 200 and the second base station 300 do not share baseband, the communication between the communication terminal 100 and the first base station 200 and the communication between the communication terminal 100 and the second base station 300 may respectively have independent control plane protocol configuration, and there are independent primary carriers respectively in the communication between the communication terminal 100 and the first base station 200 and the communication between the communication terminal 100 and the second base station 300. The control managements to the secondary carriers of the first base station 200 and the second base station 300 and the adjustments to the primary carriers of the first base station 200 and the second base station 300 may be performed through a method of intra-site carrier aggregation respectively.

In addition, when the first base station 200 and the second base station 300 both connect with the communication terminal 100, at least one of the following operations may be performed on the respective primary carriers of the first base station 200 and the second base station 300: data transmission of respective control plane protocol configurations, transmission of uplink control channel, measurements of mobility and wireless link failure.

Above determination performed on the first base station 200 side is denoted by 203 in FIG. 2. Specifically, the process may be performed by the first base station 200 per se, or by a communication apparatus or a function unit thereof for changing a base station communicating with a communication terminal on the first base station 200 side, such as a Base Band Unit (BBU) which the first base station 200 connects to, or by other suitable function unit.

Thereafter, the first base station 200 sends a request regarding the first base station 200 and the second base station 300 both connecting with the communication terminal 100 (204). It shows in the request that after the communication between the communication terminal 100 and the second base station 300 is established, the communication between the communication terminal 100 and the first base station 200 is still kept. For example, inter-node interaction information in the 3GPP TS36.331 may be improved, such that said signaling may be included in the inter-node interaction information. In other situations such as WiFi, other inter-node interaction information may also be improved. It should be understood by those skilled in the art that the process may be performed by the first base station 200 per se, or by a communication apparatus or a function unit thereof for changing a base station communicating with a communication terminal, or by other suitable function unit. In other words, the function unit performing the above process may be a part of the first base station 200 or a function unit independent of the first base station 200.

On the second base station 300 side, it is determined that whether the first base station 200 and the second base station 300 both perform data transmission connection with the communication terminal 100 on different carrier resources and with respect to which part of traffic of the communication terminal 100 the second base station 300 is able to communicate. In addition, other suitable process may also be performed on the second base station 300 side. The above process is denoted by 205 in FIG. 2. Specifically, the process may be performed by the second base station 300 per se, or by a communication apparatus or a function unit thereof for changing a base station communicating with a communication terminal, or by other suitable function unit. In other words, the function unit performing the above process may be a part of the second base station 300 or a function unit independent of the second base station 300.

Thereafter, in the case that determining that the second base station 300 can perform data transmission connection with the communication terminal 100 on different carrier resources while the communication terminal 100 keeps communication with the first base station 200, the second base station 300 sends to the first base station 200 acknowledge information comprising at least one of: with respect to which part of traffic of the communication terminal 100 the second base station 300 is able to communicate, a specific preamble for random access, system information of a new carrier on which the communication terminal 100 communicates with the second base station, and configuration information of control plane protocol for establishing the communication between the communication terminal and the second base station (206). For example, inter-node interaction information in the 3GPP TS36.331 may be improved to include such signaling. In a more specific example, the signaling is achieved by adding AS-config IE to the interaction information send by the second base station 300 (the destination base station) to the first base station 200 (the source base station). The AS-config IE contains RRC configuration information of the second base station 300 (the destination base station). In a situation such as WiFi, other suitable inter-node interaction information may be improved. It should be understood by those skilled in the art that the second base station 300 may also send other information for establishing communication with the communication terminal 100 to the first base station 200. In addition, it should be understood by those skilled in the art that such process may be performed by the second base station 300 per se, or by a communication apparatus or a function unit thereof for changing a base station communicating with a communication terminal on the second base station 300 side, or by other suitable function unit. In other words, the function unit performing the above process may be a part of the second base station 300 or a function unit independent of the second base station 300.

Thereafter, the first base station 200 sends to the second base station 300 the acknowledge information regarding the first base station 200 and the second base station 300 both performing data transmission connection with the communication terminal 100 on different carrier resources (207). It should be noted that the acknowledge information comprising at least one of: with respect to which part of traffic of the communication terminal 100 the second base station is able to communicate, a specific preamble for random access, system information of a new carrier on which the communication terminal 100 communicates with the second base station 300, and configuration information of control plane protocol for establishing the communication between the communication terminal 100 and the second base station 300. RRC connection reconfiguration (RRCConnectionReconfiguration) information sent to the communication terminal 100 by the first base station 200 (the source base station) in the 3GPP TS36.331 may be improved, such that the RRC connection reconfiguration information contains the above acknowledge information. In a situation such as WiFi, other suitable inter-node interaction information may be improved. It should be understood by those skilled in the art that the acknowledge information may also include other information for establishing communication with the communication terminal 100. In addition, it should be understood by those skilled in the art that such process may be performed by the first base station 200 per se, or by a communication apparatus or a function unit thereof for changing a base station communicating with a communication terminal on the first base station 200 side, or by other suitable function unit. In other words, the function unit performing the above process may be a part of the first base station 200 or a function unit independent of the first base station 200.

After receiving the above acknowledge information, the communication terminal 100 performs a suitable process (208) in order to establish communication with the second base station 300. In addition, for example, the communication terminal 100 may also not send new data packets with respect to the uplink data in the data determined to be transmitted through the second base station 300 to the first base station 200 after receiving the acknowledge information. Such process will be described in detail in the subsequent embodiments.

In process 209, communication between the communication terminal 100 and the second base station 300 is established. It should be noted that such process for establishing the communication between the communication terminal 100 and the second base station 300 may be the same to the process for establishing communication between a communication terminal and a destination base station at base station handover in the prior art only except for that the destination base station needs to determine whether the access preamble is used for initial access and handover when transferring from an idle status to an activated status, for initial access for intra-site carrier aggregation, or for keeping connections with both of the base stations through inter-site carrier aggregation.

After the connection between the communication terminal 100 and the second base station 300 is established, the second base station 300 sends to the core network 400 notification information regarding the first base station 200 and the second base station 300 both performing data transmission connection with the communication terminal 100 on different carrier resources (210). Thereafter, with respect to the downlink data in the data determined to be transmitted through the second base station 300, the core network 400 sends the new packets to the second base station 300 instead of the first base station 200. The core network 400 may also always send the downlink data to the first base station 200, and the first base station 200 may forwards it to the second base station 300.

Thereafter, as shown in FIG. 2, a part of uplink and downlink data packets may transmitted between the communication terminal 100 and the second base station 300 and between the second base station 300 and the core network 400. In addition, it may also be prescribed that the second base station 300 is only responsible for receiving the uplink data from the communication terminal 100 and sending it to the core network 400, or the second base station 300 is only responsible for receiving the downlink data from the core network 400 and sending it to the communication terminal 100.

It should be noted that after the connection between the second base station 300 and the communication terminal 100 is established, since the communication terminal 100 still keeps the connection with the first base station 200, the second base station 300 or the core network 400 does not need to send to the first base station 200 information indicating end of the communication between the first base station 200 and the communication terminal 100.

With the above manner, the communication terminal 100 originally communicating only with the first base station 200 may communicates with both of the first base station 200 and the second base station 300 on different carrier resources.

In addition, addition, modification and deletion of the carrier resources used by the communication terminal 100 may be managed by the first base station 200 or the second base station 300. Traffic carried by connecting the communication terminal 100 to a plurality of base stations such as distribution, variation and the like of the traffic may also be managed by the first base station 200 or the second base station 300. In addition, as described above, when it is mentioned that a certain process or a certain management is performed by the first base station 200 or the second base station 300, it may by performed by the first base station 200 or the second base station 300, or by a communication apparatus or a function unit thereof for changing a base station communicating with a communication terminal on the first base station 200 side or on the second base station 300 side, or by other suitable function unit. In other words, the function unit performing the above process may be a part of the first base station 200 or the second base station 300 or a function unit independent of the first base station 200 and the second base station 300.

When the first base station 200 is a macro base station and the second base station 300 is a micro base station, the second base station 300 is more sensitive to power consumption than the first base station 200. The power consumption of a base station is always related to the traffic amount of downlink data sent to user by the base station. Therefore, when the communication terminal 100 performs data transmission on different carrier resources through both of the first base station 200 as the macro base station and the second base station 300 as the micro base station, the downlink traffic from the base station to the communication terminal 100 may be mostly performed by the first base station 200 which is not much sensitive to the power consumption, and the uplink traffic from the communication terminal 100 to the base station may be mostly performed by the second base station 300 which is sensitive to the power consumption. This is because that the influence caused by the uplink traffic from the communication terminal 100 to the base station to the power consumption of the base station is small. In other words, when it is determined which part of traffic of the communication terminal 100 is performed by the second base station 300, the uplink data has a priority over the downlink data to be performed by the second base station 300.

With the above manner, communication performance may be improved during changing the base station communicating with the communication terminal 100, thereby better performing the inter-site carrier aggregation.

2. Second Embodiment of the Disclosure

Hereinafter, the communication method according to the second embodiment of the disclosure will be described in conjunction with FIGS. 3A, 3B and 4A, 4B.

It should be noted that as for the second to the fourth embodiments of the disclosure, it is mainly described the process of data plane, whereas as for the communication method according to the first embodiment of the disclosure, it is mainly described the signaling interaction of control plane.

Figure 3A:
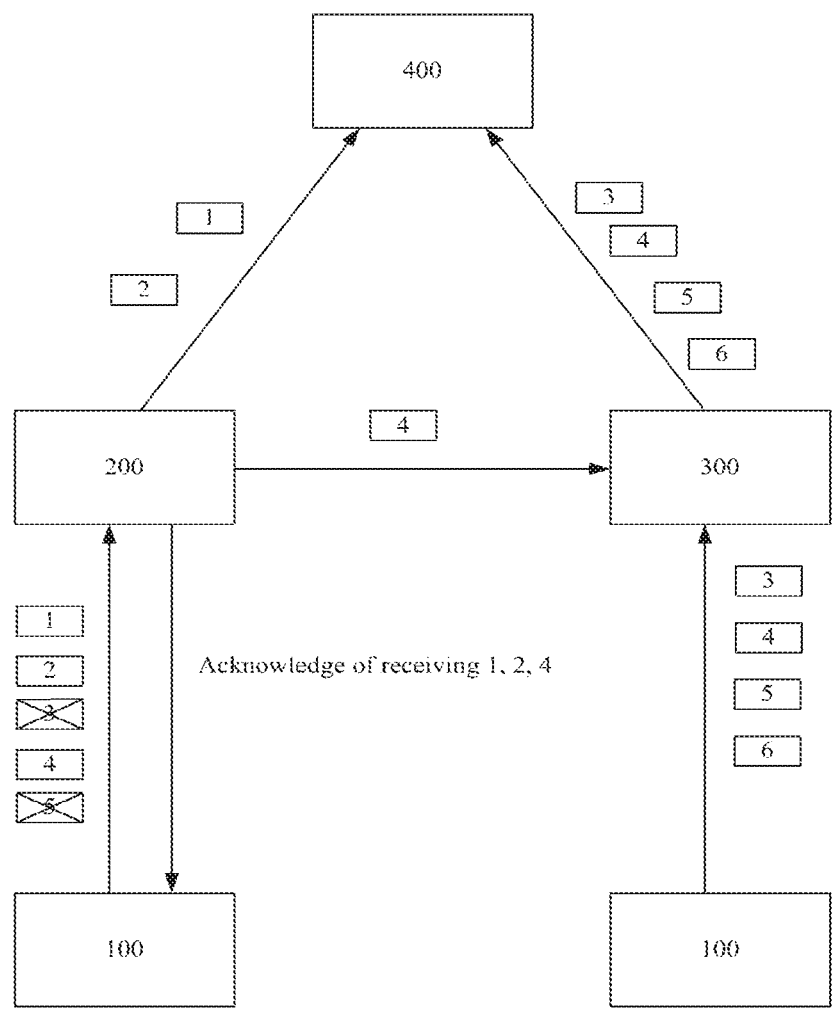
FIGS. 3A and 3B are schematic diagrams illustrating existing base station handover with respect to uplink data for contrast.
Figure 3B:
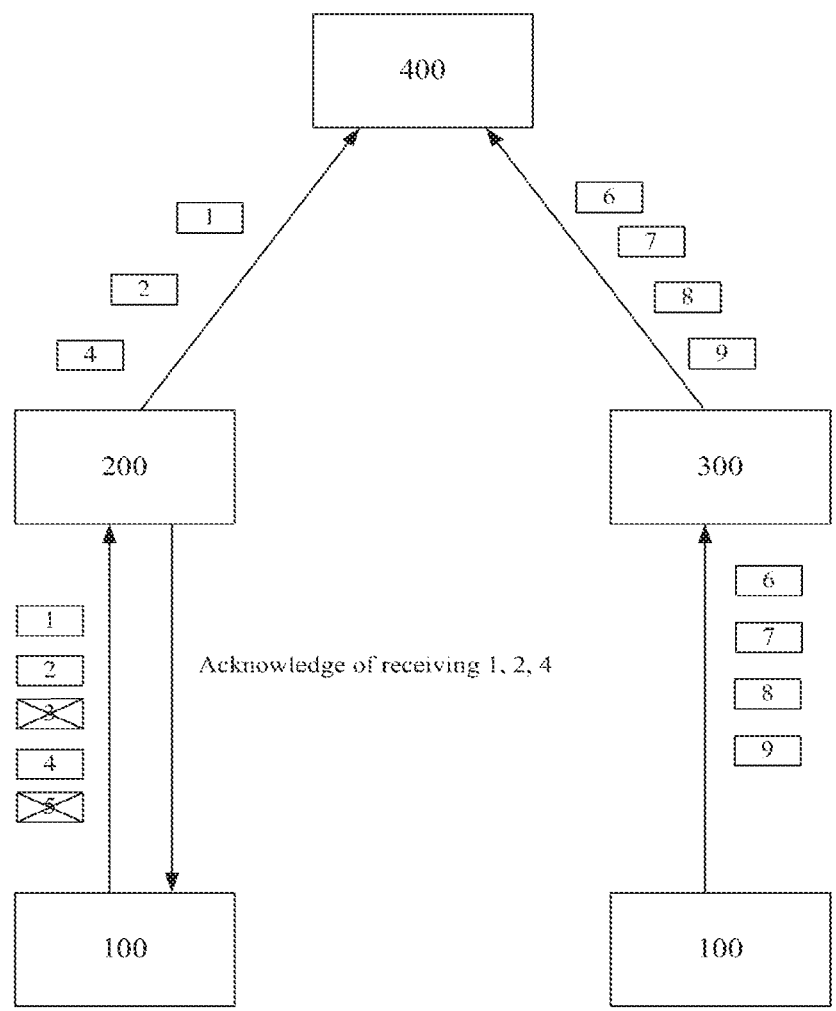

FIGS. 3A and 3B illustrate schematic diagrams of uplink data forwarding in existing base station handover, to contrast against the process regarding uplink data in the communication method according to the second embodiment of the disclosure shown in FIG. 4.

Firstly, in existing base station handover, it may be classified into two types seamless handover and lossless handover according to the characteristics of carried traffic. In the seamless handover, there is a strict requirement regarding the time delay of data packet, and a certain degree of data packet loss (error) may be accepted. In the lossless handover, there is a strict requirement regarding the packet loss rate (packet error rate), and a certain degree of data packet time delay may be accepted.

As shown in FIGS. 3A, 3B, the communication terminal needs to upload data packets 1, 2, 3, 4, 5, 6, . . . to the core network. At base station handover, the communication terminal 100 has sent to the first base station 200 data packets 1, 2, 3, 4, 5, wherein the first base station 200 receives data packets 1, 2, 4 successfully and sends acknowledge information that data packets 1, 2, 4 have been received.

As for the lossless handover, as shown in FIG. 3A, after base station handover, since the communication terminal 100 disconnects the communication with the first base station 200, the communication terminal sends data packets to the second base station 300 other than the first base station 200. Since the last data packet which has been received sequentially and successfully by the first base station 200 is 2, in other words, the first data packet which is not sent to the first base station 200 by the communication terminal 100 successfully is 3, the communication terminal 100 begins to send to the second base station 300 the data packets from data packet 3.

The first base station 200 sends to the core network 400 the sequential data packets 1, 2 received successfully, and performs data forwarding of data packet 4 to the second base station 300. The second base station 300 sends to the core network 400 the sequential data packets 3, 4, 5, 6 received successfully. Thereby, it is guaranteed that the data packet sequence sent to the core network 400 from the communication terminal 100 is complete, thereby a lossless handover is achieved, it should be noted that as for data packets, since the first base station 200 receives data packet 4 successfully and forwards it to the second base station 300, the communication terminal 100 may resend data packet 4 to the second base station 300 (as shown in FIG. 3A), or not resend data packet 4 to the second base station 300 but send data packets 3, 5, 6 to the second base station 300.

As for seamless handover, the communication terminal 100 does not resend the data packets which have been sent successfully in order to guarantee real-time of the data packets, therefore as shown in FIG. 3B, the communication terminal 100 sends to the second base station 300 data packets 6, 7, 8, 9.

The first base station 200 sends the sequential data packets 1, 2 received successfully to the core network 400. The second base station 300 receives data packets 6, 7, 8, 9 from the communication terminal 100 successfully and sends data packets 6, 7, 8, 9 to the core network 400. Thereby, real-time of the data packets sent to the core network 400 from the communication terminal 100 is guaranteed, thereby a seamless handover is achieved.

It should be noted that the data forwarding between base stations of LTE protocol is generally achieved through an X2 interface, and the communication between the base station and the core network, more accurately, the communication between the base station of LTE protocol and network units of Evolved Packet Core (EPC) core network is achieved through an S2 interface.

In addition, it should be noted that the data packet resent between the base station and the core network and between the second base station 300 and the communication terminal 100 is not discussed in the disclosure. In other words, in the disclosure, it supposes that the data communication between the base station and the core network and between the second base station 300 and the communication terminal 100 is reliable and accurate. Under teaching of the disclosure, those skilled in the art may apply the features of the embodiments of the disclosure to the situation that a data packet resending problem occurs in the data communication between the base station and the core network and between the second base station 300 and the communication terminal 100.

In an example of the communication method according to the embodiments of the disclosure, after the communication terminal 100 receives acknowledge information regarding the first base station 200 and the second base station 300 both performing data transmission connection with the communication terminal 100 on different carrier resources or after the connection between the communication terminal 100 and the second base station 300 is established, with respect to the uplink data of the traffic which is determined to be communicated between the communication terminal 100 and the second base station 300, the communication terminal 100 may continue data packets which are being sent to the first base station 200, and after the connection between the communication terminal 100 and the second base station 300 is established, the communication terminal 100 may send to the second base station 300 the new data packets.

Figure 4A:
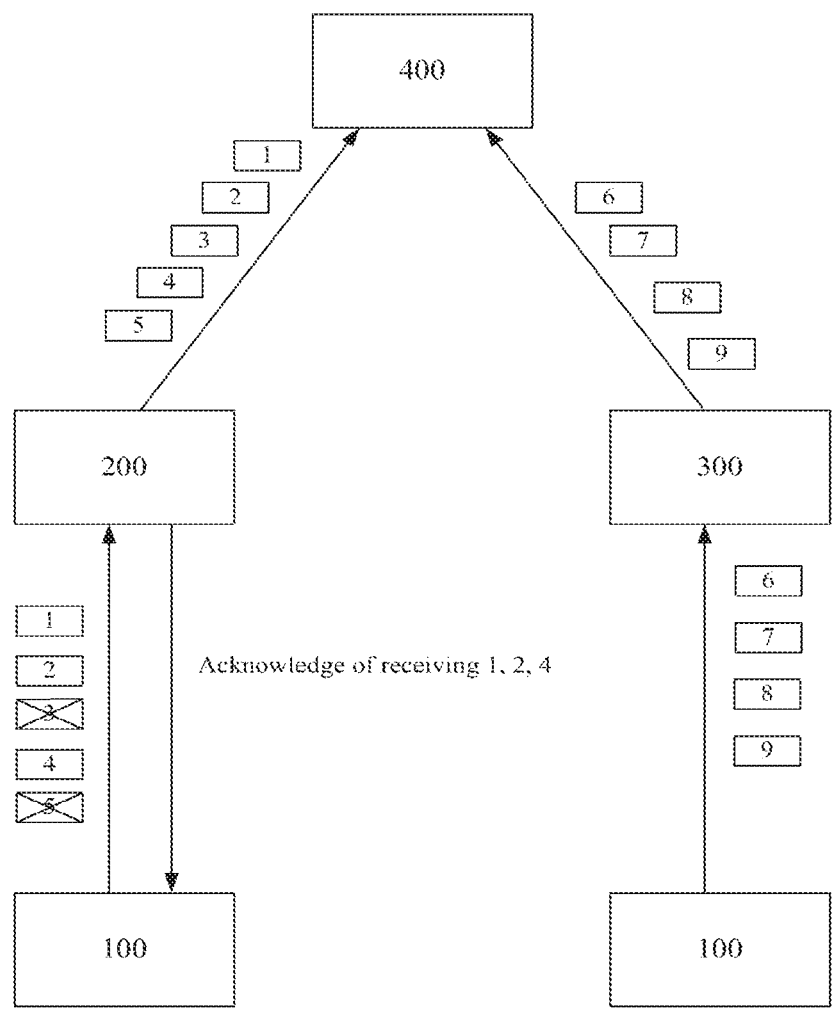
FIGS. 4A and 4B are schematic diagrams illustrating a communication method with respect to the uplink data according to a second embodiment of the disclosure.
Figure 4B:
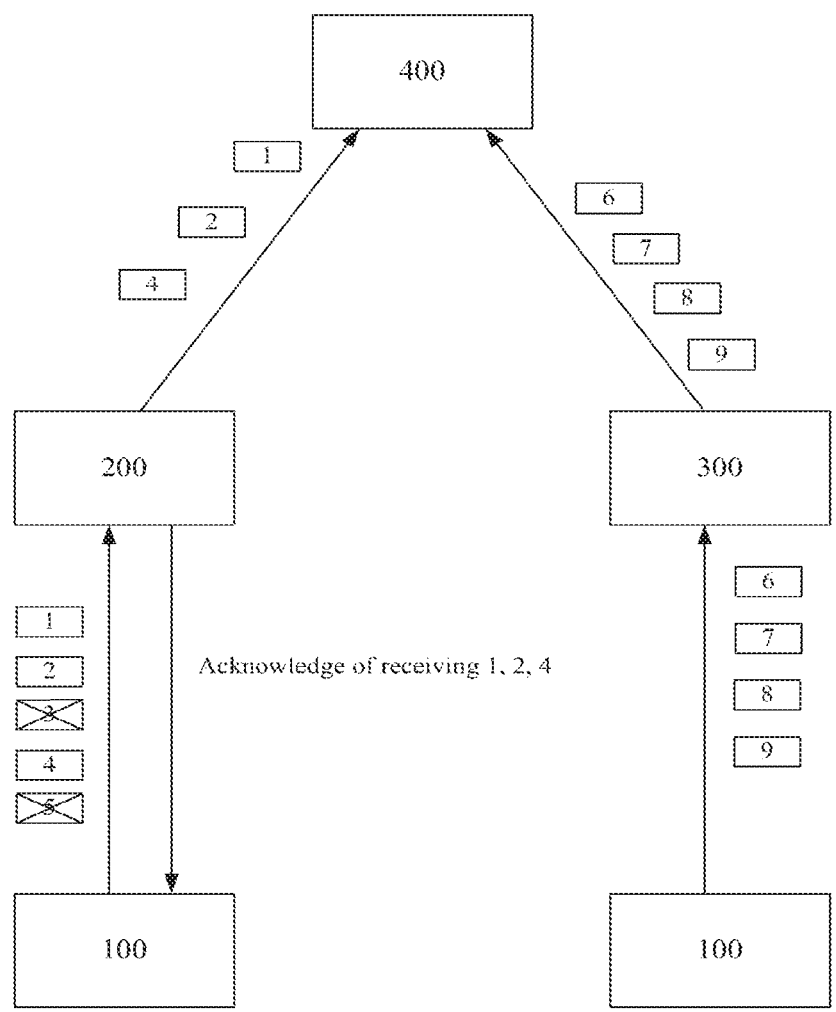

Specifically, as shown in FIGS. 4A, 4B, the uplink data of the traffic which is determined to be communicated between the communication terminal 100 and the second base station 300 includes data packets 1, 2, 3, 4, 5, 6, . . . , wherein before the communication terminal 100 receives the acknowledge information, the communication terminal 100 sends to the first base station 200 data packets 1, 2, 3, 4, 5 successfully. Only data packets 1, 2, 4 have been received by the first base station 200 successfully, therefore the first base station 200 sends to the communication terminal 100 acknowledge information that data packets 1, 2, 4 have been received.

In the lossless handover (that is, in the case that the traffic requiring high data integrity is being transmitting), as shown in FIG. 4A, the communication terminal 100 continues data packets which are being sent to the first base station 200 and data packets which have been sent to the first base station 200, that is, the communication terminal 100 resends data packets 3 and 5 based on the acknowledge information received from the first base station 200 until the first base station 200 receives data packets 3, 5 successfully. It should be noted that the communication terminal 100 does not send data packet 6 (a new data packet after determining that the inter-site carrier aggregation is performed) to the first base station 200.

After establishing the communication with the second base station 300, the communication terminal 100 send data packet 6 and the data packets thereafter to the second base station 300.

The first base station 200 may directly send data packets 1, 3, 4, 5 received from the communication terminal 100 to the core network 400.

In the seamless handover (that is, in the case that the traffic requiring high real-time of data packets is being transmitting), the manner shown in FIG. 4A may be adopted to reduce packet loss rate, or as shown in FIG. 4B, the communication terminal 100 does not resend data packets 3 and 5 to the first base station 200, but send data packet 6 to the second base station after establishing the communication with the second base station 300. It should be understood that if the time that communication terminal 100 receives the information determining that the inter-site carrier aggregation is performed is far away from the time that the communication terminal 100 establishes the communication with the second base station 300, it is possible that the communication terminal 100 begins to send data to the second base station 300 from data packet 7 or 8 or sequent data packets thereafter, to satisfy the requirement to real-time of the carried traffic.

The first base station 200 may send data packets 1, 2, 4 received from the communication terminal 100 to the core network 400, and the second base station 300 may send data packets 6, 7, 8, 9 received from the communication terminal 100 to the core network 400.

In addition, in another example of the communication method according to the second embodiment of the disclosure, after the communication between the communication terminal 100 and the second base station 300 is established (instead of after the communication terminal 100 receives acknowledge information regarding the first base station 200 and the second base station 300 both performing data transmission connection with the communication terminal 100 on different carrier resources), with respect to the uplink data of the traffic which is determined to be communicated between the communication terminal 100 and the second base station 300, the communication terminal 100 may continue data packets which are being sent to the first base station 200, and send to the second base station 300 the new data packets.

In such case, the specific processes of the lossless handover and the seamless handover are similar to those described with respect to FIGS. 4A, 4B, and the description thereof will be omitted.

It should be noted that in the two examples as described above, although data packets 3, 5 sent to the first base station 200 from the communication terminal 100 are not received by the first base station 200 successfully when being sent first time, in either the lossless handover or the seamless handover, the communication terminal 100 may not resend data packets 3, 5 to the second base station 300. In addition, there is no need for data forwarding between the first base station 200 and the second base station 300.

In particular, in the case that the communication terminal 100 stops sending new data packets to the first base station 200 after establishing connection with the second base station 300, comparison with the case that the communication terminal 100 stops sending new data packets to the first base station 200 after receiving acknowledge information regarding the first base station 200 and the second base station 300 both performing data transmission connection with the communication terminal 100 on different carrier resources, the amount of data packets to be transmitted at the first base station 200 is large. This is because that the time that the communication terminal 100 receives the above acknowledge information is earlier than the time that the communication terminal 100 establishes the connection with the second base station 300.

With the above manner, during changing the communication between the communication terminal 100 and base stations, communication performance is improved. For example, the communication terminal 100 needs not to resend to the second base station 300 the data packet which has been sent to the first base station 200.

3. Third Embodiment of the Disclosure

Hereinafter, the communication method according to the third embodiment of the disclosure will be described in conjunction with FIGS. 5, 6A, 6B.

It should be noted that the second embodiment of the disclosure is used for uplink data and the third embodiment of the disclosure is used for downlink data.

Figure 5:
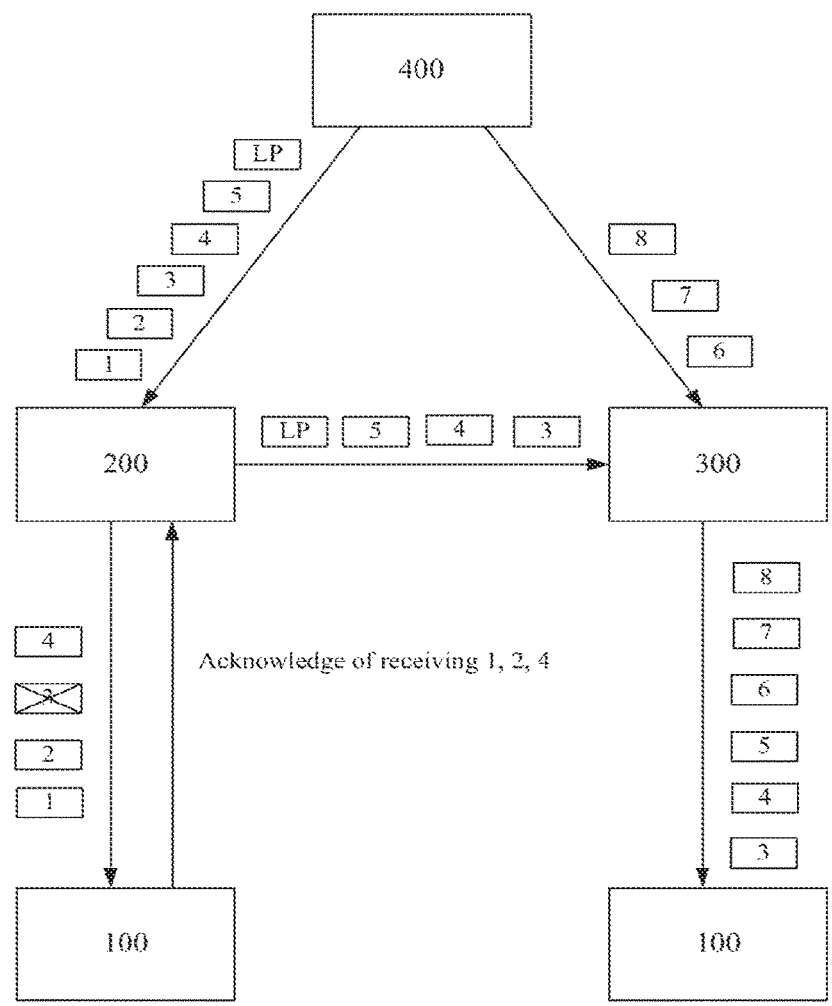
FIG. 5 is a schematic diagram illustrating existing base station handover with respect to downlink data for contrast.
Figure 6A:
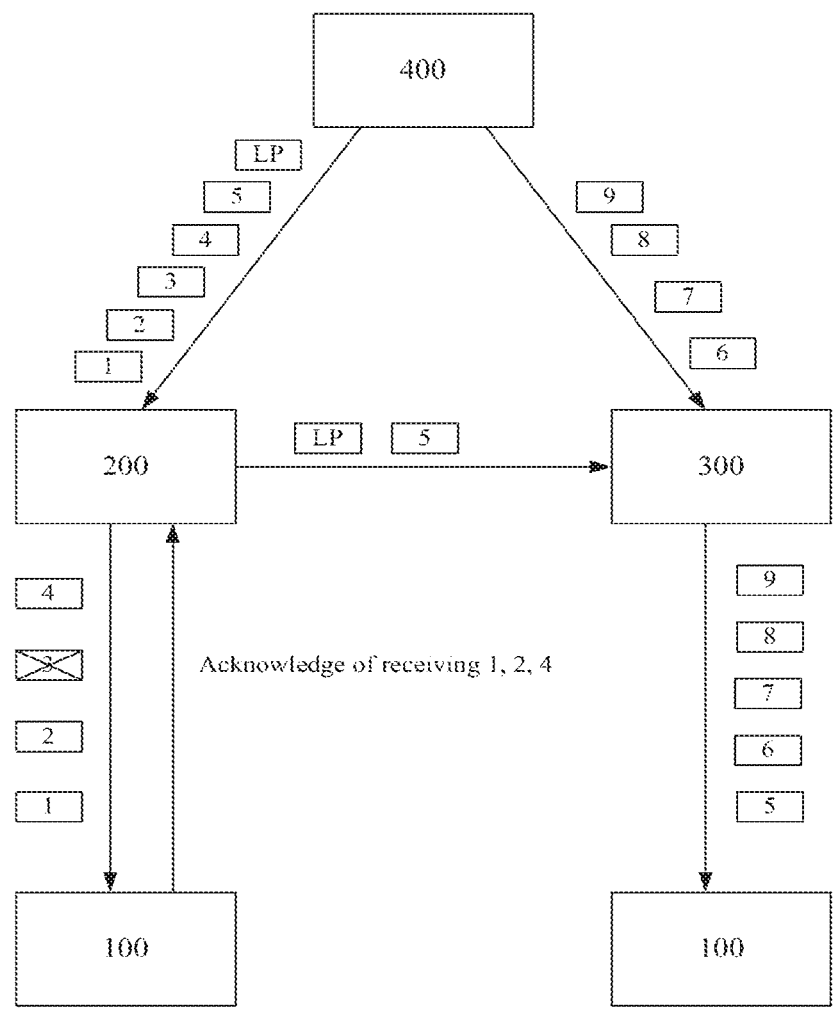
FIGS. 6A and 6B are schematic diagrams illustrating a communication method with data forwarding with respect to the downlink data according to a third embodiment of the disclosure.
Figure 6B:
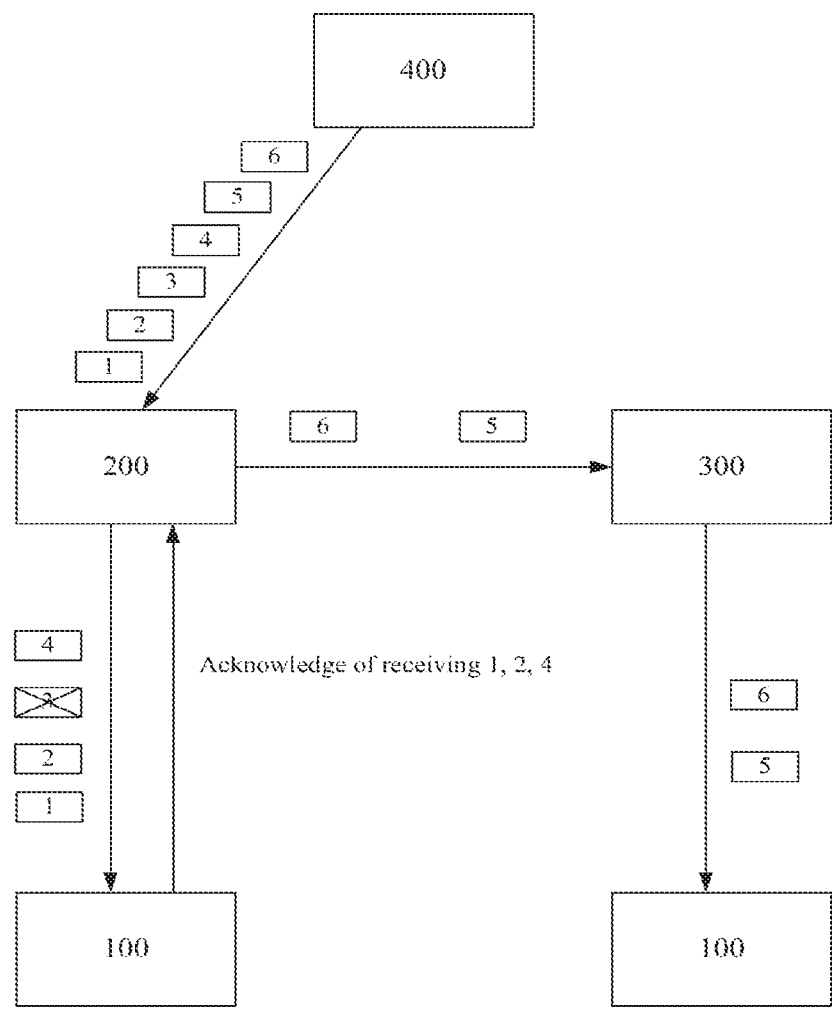

FIG. 5 illustrates a schematic diagram of downlink data in existing base station handover, to contrast against the process regarding downlink data in the communication method according to the third embodiment of the disclosure shown in FIGS. 6A, 6B.

It should be noted that FIG. 5 illustrates downlink data forwarding in the lossless handover, and downlink data forwarding in the seamless handover will be described with reference to FIG. 5.

As shown in FIG. 5, before base station handover, the core network 400 sends to the first base station 200 data packets 1, 2, 3, 4, 5, and the first base station 200 sends to the communication terminal 100 data packets 1, 2, 3, 4. Data packets 1, 2, 4 are received by the communication terminal 100 successfully, and the communication terminal 100 sends to the first base station 200 acknowledge information that data packets 1, 2, 4 are received. After base station handover, the core network 400 sends to the first base station 200 a data end symbol LP immediately after data packet 5. Therefore, from data packet 3, the first base station 200 forwards data packets 3, 4, 5 and the data end symbol LP immediately after data packet 5 to the second base station 300 based on the above acknowledge information.

In addition, after base station handover, the core network 400 sends to the second base station 300 new data packets 6, 7, 8. The second base station 300 connects the new data packets 6, 7, 8 to data packets 3, 4, 5 based on the data end symbol LP, thereby data packets 3, 4, 5, 6, 7, 8 are sent to the communication terminal 100. Then, the lossless handover is completed.

As for the seamless handover, the first base station 200 begins to perform data forwarding to the second base station 300 from data packet 5. In other words, the first base station 200 forwards data packet 5 and the data end symbol LP immediately after data packet 5 to the second base station 300. The second base station 300 connects the new data packets 6, 7, 8 received from the core network 400 to data packets 5 based on the data end symbol LP, thereby data packets 5, 6, 7, 8 are sent to the communication terminal 100. Then, the seamless handover is completed.

In an example of the communication method according to the third embodiment of the disclosure, after the communication terminal 100 receives acknowledge information regarding the first base station 200 and the second base station 300 both performing data transmission connection with the communication terminal 100 on different carrier resources or after the second base station 300 establishes connection with the communication terminal 100 and notifies the first base station 200 of this, with respect to the downlink data of the traffic which is determined to be communicated between the communication terminal 100 and the second base station 300, the communication terminal 100 may continue data packets which are being receiving from the first base station 200, and the first base station 200 performs data forwarding to the second base station 300 with respect to data packets not been sent to the communication terminal 100 yet and newly received from the core network 400. It should be noted that the notification information that the second base station 300 establishes connection with the communication terminal 100 may be sent to the first base station 200 by the second base station 300 or be sent to the first base station 200 by the communication terminal 100.

Specifically, with reference to FIG. 6A, before the communication terminal 100 receives acknowledge information regarding the first base station 200 and the second base station 300 both connecting to the communication terminal 100, the core network 400 sends to the first base station 200 data packets 1, 2, 3, 4, and the first base station 200 sends to the communication terminal 100 data packets 1, 2, 3, 4. Data packets 1, 2, 4 are received by the communication terminal 100 successfully, and therefore the communication terminal 100 sends to the first base station 200 acknowledge information that data packets 1, 2, 4 are received. After the communication terminal 100 receives acknowledge information regarding the first base station 200 and the second base station 300 both connecting to the communication terminal 100, the communication terminal 100 may continue data packets which are being receiving from the first base station 200, and not receive new data packets from the first base station 200. In other words, after the first base station 200 sends to the communication terminal 100 acknowledge information regarding the first base station 200 and the second base station 300 both connecting to the communication terminal 100, the first base station 200 does not send new data packets to the communication terminal 100.

In the lossless handover, the first base station 200 guarantees that sending of data packet 3 to the communication terminal 100 is completed. In the seamless handover, the operation may be similar to that in the lossless handover to reduce packet loss rate, or data packet 3 may be discarded. In other words, data packet 3 will not be resent.

The following description is suitable for both of the lossless handover and seamless handover.

After the first base station 200 sends to the communication terminal 100 acknowledge information regarding the first base station 200 and the second base station 300 both performing data transmission connection with the communication terminal 100 on different carrier resources, and until the core network 400 is notified that connection between the communication terminal 100 and the second base station 300 is established, the core network 400 continues to send data to the first base station 200. For example, as shown in FIG. 6A, the core network 400 sends data packet 5 and the data end symbol LP immediately after data packet 5 to the first base station 200. Since the first base station 200 does not send new data packets to the communication terminal 100 after sending data packet 4 to the communication terminal 100, the first base station 200 forwards data packet 5 and the data end symbol LP immediately after data packet 5 to the second base station 300. It should be noted that the notification information that the second base station 300 establishes connection with the communication terminal 100 may be directly sent to the core network 400 by the second base station 300. The second base station 300 may also send the notification information to the first base station 200, and the first base station 200 sends the notification information to the core network 400.

After the core network 400 is notified that connection between the communication terminal 100 and the second base station 300 is established, the core network 400 sends to the second base station 300 data packets 6, 7, 8, 9. The second base station 300 connects data packets 6, 7, 8, 9 to data packets 5 based on the data end symbol LP, thereby data packets 5, 6, 7, 8, 9 are sent to the communication terminal 100.

In addition, in another example of the communication method according to the third embodiment of the disclosure, after the connection between the communication terminal 100 and the second base station 300 is established (for example, after the first base station 200 receives notification information that the second base station 300 establishes connection with the communication terminal 100 instead of after the communication terminal 100 receives acknowledge information regarding the first base station 200 and the second base station 300 both performing data transmission connection with the communication terminal 100 on different carrier resources), with respect to the downlink data of the traffic which is determined to be communicated between the communication terminal 100 and the second base station 300, the communication terminal 100 may continue data packets which are being receiving from the first base station 200, and the first base station 200 performs data forwarding to the second base station 300 with respect to new data packets received from the core network 400. In such case, the specific processes of the lossless handover and the seamless handover are similar to those described with respect to FIG. 6A, and the description thereof will be omitted.

The difference between the above two examples of the communication method according to the third embodiment of the disclosure is only in that the first base station 200 does not send new data packets to the communication terminal 100, and the times of beginning to perform data forwarding to the second base station 300 with respect to the new data packets are different. In such two examples, the first base station 200 needs to forward the new data packets sent to the first base station 200 by the core network 400 to the second base station 300. In addition, in such two examples, the data packets which have been sent to the communication terminal 100 by the first base station 200 needs not to be forwarded to the communication terminal 100 through the second base station 300.

With the manners shown in the above two examples, during changing the communication between the communication terminal 100 and base stations, communication performance is improved. For example, the amount of data packets forwarded between base stations is reduced, and/or resending of downlink data by base stations may be omitted.

In addition, with reference to FIG. 6B, another example of the communication method according to the third embodiment of the disclosure is illustrated. In such example, after receiving notification information that connection between the second base station 300 and the communication terminal 100 is established, with respect to the downlink data of the traffic which is determined to be communicated between the communication terminal 100 and the second base station 300, the core network 400 continues to send new data packets to the first base station 200, the first base station 200 performs data forwarding to the second base station 300 with respect to the new data packets received from the core network 400, and the second base station 300 send the new data packets received from the first base station 200 to the communication terminal 100. In such process, data forwarding of downlink data between the first base station 200 and the second station 300 is not performed.

Similar to FIG. 6A, before the communication terminal 100 receives acknowledge information regarding the first base station 200 and the second base station 300 both performing data transmission connection with the communication terminal 100 on different carrier resources, or before the second base station 300 establishes connection with the communication terminal 100, the core network 400 sends to the first base station 200 data packets 1, 2, 3, 4, and the first base station 200 sends to the communication terminal 100 data packets 1, 2, 3, 4. Data packets 1, 2, 4 are received by the communication terminal 100 successfully, and therefore the communication terminal 100 sends to the first base station 200 acknowledge information that data packets 1, 2, 4 are received. After the communication terminal 100 receives the acknowledge information regarding the first base station 200 and the second base station 300 both performing data transmission connection with the communication terminal 100 on different carrier resources, the communication terminal 100 may continue data packets which are being receiving from the first base station 200, not receive new data packets from the first base station 200, and begin to receive new data packets from the second base station 300.

In FIG. 6B, it is different from FIG. 6A in that even though the core network 400 is notified that connection between the communication terminal 100 and the second base station 300 is established, the core network 400 continues to send new data packets to the first base station 200 and not begin to send new data packets to the second base station 300. The reason is that the quality of communication between the second base station 300 and the core network 400 is poorer than the quality of communication between the first base station 200 and the core network 400. In addition, in FIG. 6B, the core network 400 may not be notified that connection between the communication terminal 100 and the second base station 300 is established, and therefore the core network 400 continues to send data packets of downlink data to the first base station 200. Likewise, the first base station 200 forwards the new data packets received from the core network 400 to the second base station 300.

Therefore, in the solution corresponding to FIG. 6B, the data packets sent to the communication terminal 100 by the second base station 300 are forwarded by the first base station 200. At this time, the second base station 300 needs not to receive information for determining the core network number of the last data packet sent to the first base station 200 from the core network 400 or the core network number of the first data packet sent to the second base station 300 from the core network 400.

In such case, information regarding connection between the communication terminal 100 and the second base station 300 being established is sent to the first base station 200 by the communication terminal 100 or the second base station 300, and is notified to the core network 400 by the first base station 200.

With the communication method according to this example, better communication performance of communication between the first base station 200 and the core network 400 is exploited, there the communication performance is improved.

4. Fourth Embodiment of the Disclosure

Hereinafter, the communication method according to the fourth embodiment of the disclosure will be described in conjunction with FIG. 7.

It should be noted that in the examples of the communication method according to the third embodiment of the disclosure, downlink data needs to be forwarded. However, in the communication method according to the fourth embodiment of the disclosure, the downlink data needs not to be forwarded.

In the communication method according to the fourth embodiment of the disclosure, as described above with respect to FIG. 2, after connection between the communication terminal 100 and the second base station 300 is established, information regarding connection between the communication terminal 100 and the second base station 300 being established is sent to the core network 400. After the core network 400 receives the information regarding connection between the communication terminal 100 and the second base station 300 being established, the core network 400 begins to send new data packets to the second base station 300, the first base station 200 continues data packets which are being sent to the communication terminal 100 and data packets which have been received from the core network 400, and the second base station 300 sends the new data packets received from the core network 400 to the communication terminal 100.

Figure 7:
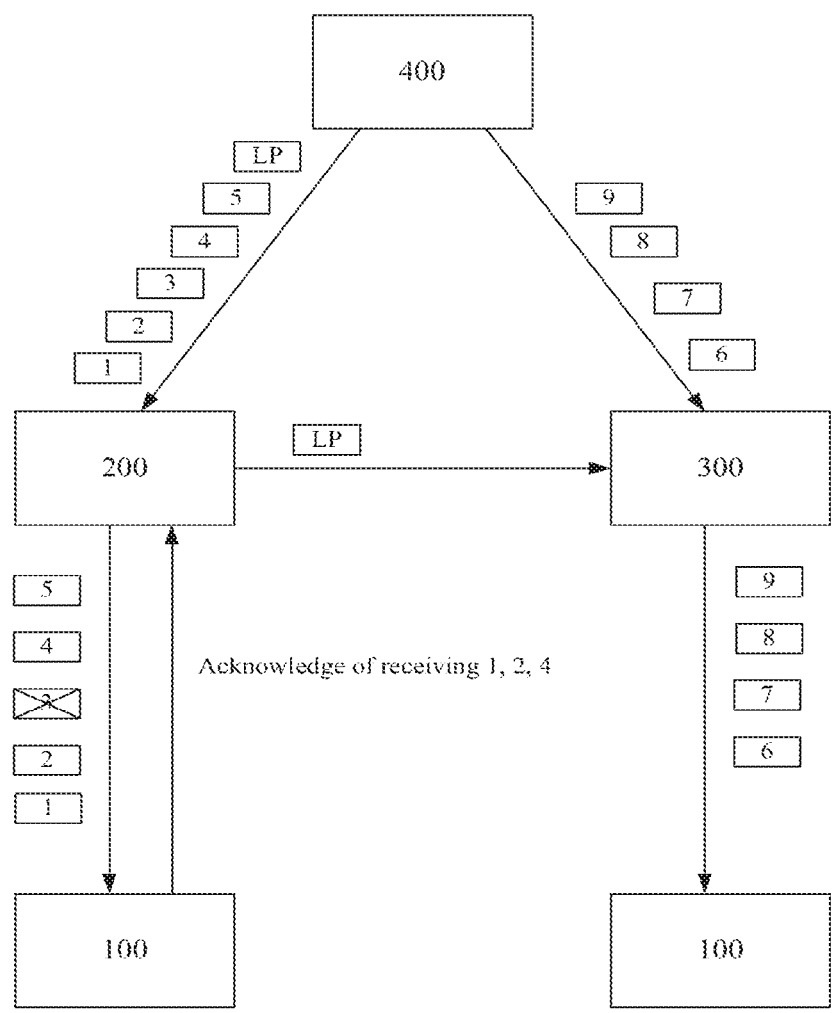
FIG. 7 is a schematic diagrams illustrating a communication method without data forwarding with respect to the downlink data according to a fourth embodiment of the disclosure.

Specifically, as shown in FIG. 7, before the core network 400 receives the information regarding connection between the communication terminal 100 and the second base station 300 being established, the core network 400 sends to the first base station 200 data packets 1, 2, 3, 4, 5, and the first base station 200 sends to the communication terminal 100 data packets 1, 2, 3, 4. Data packets 1, 2, 4 are received by the communication terminal 100 successfully, and the communication terminal 100 sends to the first base station 200 acknowledge information that data packets 1, 2, 4 are received. After the core network 400 receives the information regarding connection between the communication terminal 100 and the second base station 300 being established, the core network 400 sends to the first base station a data end symbol LP immediately after data packet 5 and begins to send data packets 6, 7, 8, 9 to the second base station 300. The first base station 200 continues to send data packet 5 (which has been received) before the data end symbol LP to the communication terminal 100. In addition, the first base station 200 may send the data end symbol LP to the second base station 300.

In the lossless handover, the first base station 200 guarantees that sending of data packet 3 to the communication terminal 100 is completed. In the seamless handover, the operation may be similar to that in the lossless handover to reduce packet loss rate, or data packet 3 may be discarded. In other words, data packet 3 will not be resent.

The second base station 300 sends the data packets 6, 7, 8, 9 received from the core network 400 to the communication terminal 100 base on the data end symbol LP.

Herein the data end symbol LP may indicate that the last data packet sent to the first base station 200 by the core network 400 is data packet 5. The core network 400 may also sends to the second base station 300 the data end symbol LP immediately before data packet 6. At this time, the data end symbol LP may indicate that the first data packet sent to the first base station 200 by the core network 400 is data packet 6. Therefore, the second base station 300 may determine which data packet the last data packet sent to the first base station 200 from the core network 400 is or which data packet the first data packet sent to the first base station 200 from the core network 400 is.

In the above process, data forwarding may not be performed between the first base station 200 and the second base station 300. It should be noted that since LP is only a symbol, the process of sending the data end symbol LP to the second base station 300 by the first base station 200 is not performing data forwarding between the first base station 200 and the second base station 300.

Herein, the data end symbol is the number of data packet sent by the core network 400, and the number may be the wire transmission number of data packet.

The synchronization of core network numbers is guaranteed by means of the data end symbol LP. In addition, if the first base station and the second base station have the same protocol, the first base station may send to the second base station air interface number information. Specifically, in LTE, the air interface number information is PDCP (Packet Data Convergence Protocol) data number, the content of which may be PDCP number of data packet 5 or 6 in FIG. 7, in order to guarantee that air interface data is processed in order on the terminal side. In other words, the first base station 200 may send to the second base station 300 PDCP number of the last data packet transmitted at the first base station 200 or PDCP number of the first data packet expected to be transmitted at the second base station 300.

With the above manner, during changing the base station communicating with the communication terminal 100, communication performance is improved. For example, data forwarding between base stations is not performed, and/or resending of downlink data by base stations may be omitted.

5. Fifth Embodiment of the Disclosure

Hereinafter, the communication apparatuses according to the fifth embodiment of the disclosure will be described in conjunction with FIGS. 8A to 8D.

Figure 8A:
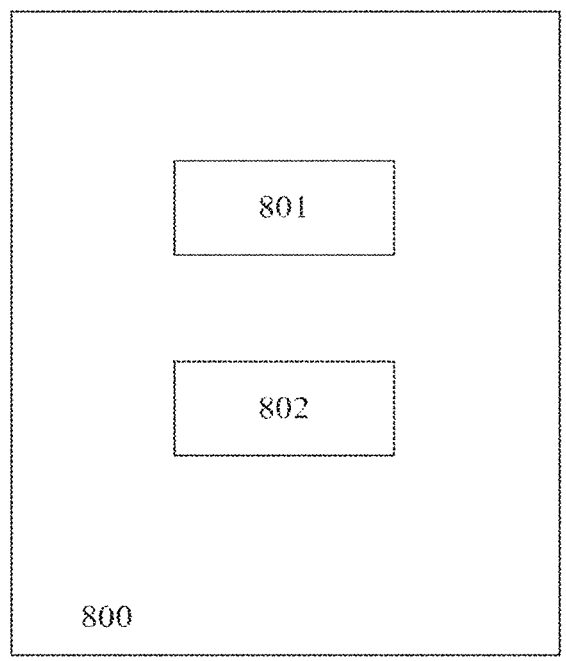
FIGS. 8A, 8B, 8C, and 8D are block diagrams illustrating a communication apparatus according to a fifth embodiment of the disclosure.

FIG. 8A illustrates a communication apparatus 800 according to the fifth embodiment of the disclosure. The communication apparatus 800 is on the first base station 200 side and used for changing the communication between base stations and the communication terminal 100, and comprises: a request sending unit 801 configured to send, in the case that a measuring result of signals of the second base station 300 from the communication terminal 100 which is communicating with the first base station 200 meets a predetermined condition, the second base station 300 a request regarding the first base station 200 and the second base station 300 both performing data transmission connection with the communication terminal 100 on different carrier resources, such that the first base station 200 and the second base station 300 both perform data transmission connection with the communication terminal 100 on different carrier resources; and an acknowledge transmission unit 803 configured to receive acknowledge information from the second base station 300 and send the acknowledge information to the communication terminal 100, wherein the acknowledge information comprises at least one of: with respect to which part of traffic of the communication terminal 100 the second base station 300 is able to communicate, a specific preamble for random access, system information of a new carrier on which the communication terminal 100 communicates with the second base station 300, and configuration information of control plane protocol for establishing the communication between the communication terminal 100 and the second base station 300.

In other words, the request sending unit 801 may be used for performing a process corresponding to process 204 in FIG. 2, and acknowledge transmission unit 803 may be used for performing a process corresponding to processes 206, 207 in FIG. 2.

In addition, the communication apparatus 800 may comprise other units for performing processes corresponding to the other processes in the communication methods according to the first to fourth embodiments of the disclosure.

For example, the communication apparatus 800 may also comprise a function unit for sending to the communication terminal 100 control information for measuring signal of the second base station 300 (see process 201 in FIG. 2); and a function unit for receiving a measuring result from the communication terminal 100 (see process 202 in FIG. 2).

It should be noted that the communication apparatus 800 may be an independent apparatus and operate in connection with the communication terminal 100, the first base station 200, the second base station 300 and the core network 400. The communication apparatus 800 may also be a part of the first base station 200.

Figure 8B:
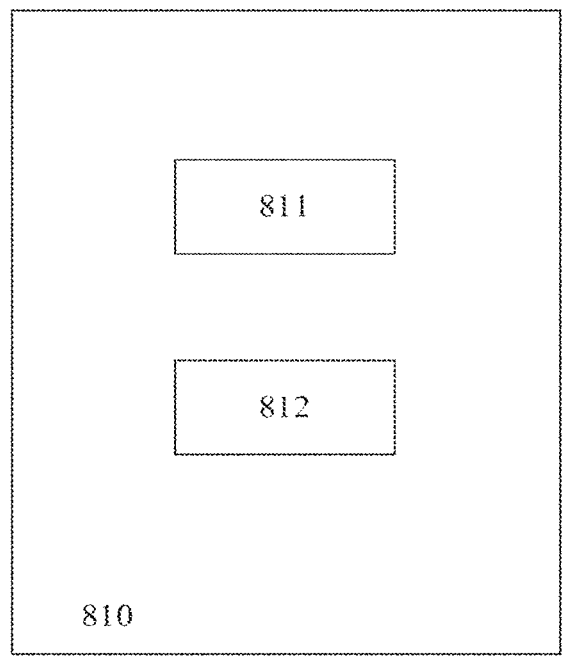

FIG. 8B illustrates a communication apparatus 810 according to the fifth embodiment of the disclosure. The communication apparatus 810 is on the second base station 300 side for changing the communication between base stations and the communication terminal 100, and comprises: a request receiving unit 811 configured to receive, from the first base station 200, a request regarding the first base station 200 and the second base station 300 both performing data transmission connection with the communication terminal 100 on different carrier resources (see process 204 in FIG. 2); and an acknowledge unit 812 configured to, after receiving the request from the first base station 200, generate an acknowledge information and send the acknowledge information to the first base station 200 (see processes 205, 206 in FIG. 2), wherein the acknowledge information comprises at least one of: with respect to which part of traffic of the communication terminal 100 the second base station 300 is able to communicate, a specific preamble for random access, system information of a new carrier on which the communication terminal 100 communicates with the second base station 300, and configuration information of control plane protocol for establishing the communication between the communication terminal 100 and the second base station 300.

In addition, the communication apparatus 810 may comprise other units for performing processes corresponding to the other processes in the communication methods according to the first to fourth embodiments of the disclosure.

For example, the communication apparatus 810 may also comprise a function unit for establishing connection with the communication terminal 100 (see process 209 in FIG. 2); and a function unit for notifying the core network 400 of information regarding connection between the communication terminal 100 and the second base station 300 being established (see process 210 in FIG. 2).

It should be noted that the communication apparatus 810 may be an independent apparatus and operate in connection with the communication terminal 100, the first base station 200, the second base station 300 and the core network 400. The communication apparatus 810 may also be a part of the second base station 300.

Figure 8C:
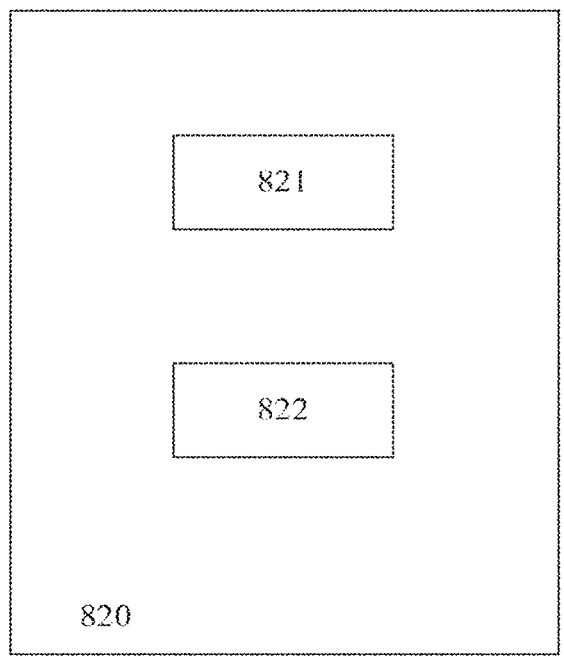

FIG. 8C illustrates a communication apparatus 820 according to the fifth embodiment of the disclosure. The communication apparatus 820 is on the communication terminal side for changing the communication between base stations and the communication terminal, and comprises: an acknowledge receiving unit 821 configured to receive, in the case that it is determined that the first base station 200 and the second base station 300 both perform data transmission connection with the communication terminal 100 on different carrier resources, acknowledge information from the first base station 200 (see process 207 in FIG. 2), wherein the acknowledge information comprises at least one of: with respect to which part of traffic of the communication terminal 100 the second base station 300 is able to communicate, a specific preamble for random access, system information of a new carrier on which the communication terminal 100 communicates with the second base station 300, and configuration information of control plane protocol for establishing the communication between the communication terminal 100 and the second base station 300: and a connection establishing unit 822 configured to, in the case of keeping the connection with the first base station 200, establish the connection with the second base station 300 (see process 200 in FIG. 2).

In addition, the communication apparatus 820 may comprise other units for performing processes corresponding to the other processes in the communication methods according to the first to fourth embodiments of the disclosure.

For example, the communication apparatus 820 may also comprise a function unit for receiving control information for measuring signal of the second base station 300 from the first base station 200 (see process 201 in FIG. 2); and a function Unit for sending a measuring result to the first base station 200 (see process 202 in FIG. 2).

It should be noted that the communication apparatus 820 may be an independent apparatus and operate in connection with the communication terminal 100, the first base station 200, the second base station 300 and the core network 400. The communication apparatus 820 may also be a part of the communication terminal 100.

Figure 8D:
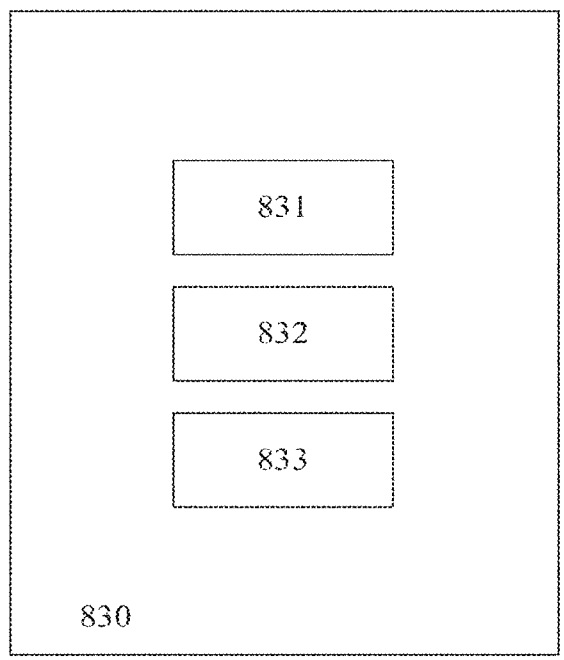

FIG. 8D illustrates a communication apparatus 830 according to the fifth embodiment of the disclosure. The communication apparatus 830 is on the core network 400 side for changing the communication between base stations and the communication terminal, and comprises: a notification receiving unit (831) configured to, after the communication terminal 100 which is communicating with a first base station 200 establishes the connection with a second base station 300 on a carrier resource which is different from that of the first base station 200, notification information regarding the first base station 200 and the second base station 300 both performing data transmission connection with the communication terminal 100 on different carrier resources from the first base station 200 or the second base station 300 (see process 210 in FIG. 2); a first communication unit 832 configured to, after receiving the notification information, keep communicating with the communication terminal 100 via the first base station 200 (see the data packet communication between the first base station 200 and the core network 400 and between the first base station 200 and the communication terminal 100 shown in lower part of FIG. 2); and a second communication unit 833 configured to, after receiving the notification information, begin to communicate with the communication terminal 100 via the second base station 300 (see the data packet communication between the second base station 300 and the core network 400 and between the second base station 300 and the communication terminal 100 shown in lower pail of FIG. 2).

In addition, the communication apparatus 830 may comprise other units for performing processes corresponding to the other processes in the communication methods according to the first to fourth embodiments of the disclosure.

It should be noted that the communication apparatus 830 may be an independent apparatus and operate in connection with the communication terminal 100, the first base station 200, the second base station 300 and the core network 400. The communication apparatus 830 may also be a part of the core network 400.

The communication apparatuses and the function units thereof according to the fifth embodiment of the disclosure may be implemented in hardware, software or the combination thereof (for example, FPGA). Those algorithms and procedures included as part of the embodiments of the disclosure does not necessarily relate to any particular computer or other device unless otherwise indicated. In particular, various universal computers may be used by means of a program written according to the teaching herein, or a more dedicated equipment (for example, integrated circuit) may be constructed conveniently to perform required method steps or implement required function units. Therefore, the invention may be embodied with one or more programs running on one or more programmable computer systems, in which each of programmable computer systems includes at least one processor, at least one data storage system (including volatile and nonvolatile memory and/or storage element), at least one input device or port and at least one output device or port. Program code may be applied to input data to perform the functions described herein and generate output information. The output information may be applied to one or more output devices in a known manner.

6. Sixth Embodiment of the Disclosure

According to the sixth embodiment of the disclosure, the communication methods according to the first to fourth embodiments of the disclosure and the communication apparatus according to the fifth embodiment of the disclosure may be configured by software, firmware, hardware or the combination thereof. In case of implementing by software or firmware, program constituting the software or firmware may be mounted to a machine having a dedicated hardware structure from a storage medium or network (for example, the universal computer 900 as illustrated in FIG. 9), when the computer is mounted with various programs, the computer may execute various functions.

Figure 9:
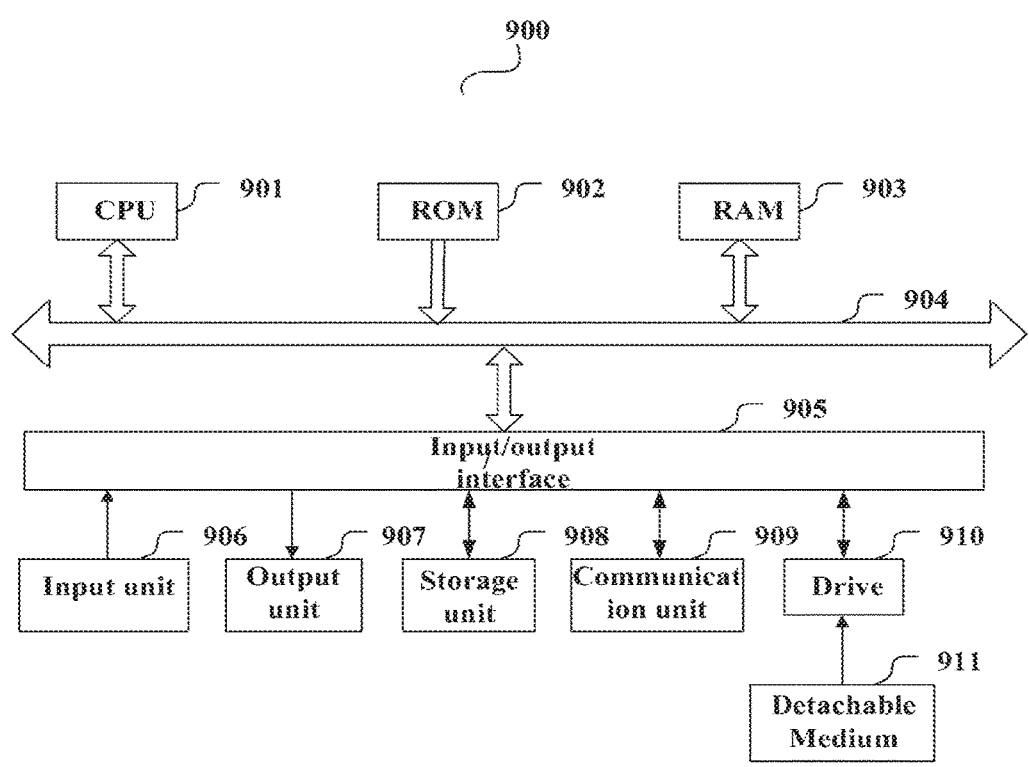
FIG. 9 is a block diagram illustrating a hardware configuration according to a sixth embodiment of the disclosure.

In FIG. 9, a central processing unit (CPU) 901 perform various processes according to the program stored in the Read-Only Memory (ROM) 902 or programs load from the storage unit 908 to the Random Access Memory (RAM) 903. In the RAM 903, store also data required when the CPU 901 performs various processes. CPU 901, ROM 902 and RAM 903 are connected from one to another via bus 904. Input/output interface 905 is also connected to the bus 904.

The following components are connected to the input/output interface 905: input unit 906 (including keyboard, mouse, etc); output unit 907 (including display, such as cathode ray tube (CRT), liquid costal display (LCD), etc., and speakers and so on); storage unit 908 (including hard disc, etc.); and communication part 909 (including network interface cards such as LAN cards, modems and so on). The communication unit 909 performs communication process via network like the internet. According to requirements, drive 910 is also connected to the input/output interface 905. Detachable medium 911 such as disc, CD, magneto-optical disc, semiconductor memory, and so on is installed on the drive 910 based on requirements, such that the computer program read out therefrom is installed in the storage unit 908 based on requirements.

In case of implementing the above processes by software, programs constituting the software are installed from a network like the Internet or from a storage medium like the detachable medium 911.

Those skilled in the art should be understood that such storage medium is not limited to the detachable medium 911 which is stored with programs and distributes separate from the method to provide a user with program as illustrated in FIG. 9. The example of the detachable medium 911 includes disc (including floppy disc (registered marks)), CD (including CD read only memory (CD-ROM) and digital versatile disc (DVD)), magneto-optical disc (including mini-disc (MD) (registered marks)) and semiconductor memory. Alternatively, the storage medium may be ROM 902, or hard disc included in the storage unit 908 in which a program is stored and the program is distributed to a user with the method including the same.

The disclosure also provides a program product storing machine readable instruction code. When read and executed by a machine, the instruction code may implement the communication methods according to the embodiments of the disclosure. Correspondingly, various storage medium for carrying the program product such as magnetic disk, optical disk, magneto-optical disk, semiconductor memory, etc. is also included in the disclosure.

In addition, obviously, respective operations of the communication methods according to the embodiments of the disclosure may also be implemented in a manner of computer executable program stored in various machine readable storage mediums.

Although preferable embodiments of the disclosure have been described above, the above description are only used to illustrate the disclosure, and do not limit the disclosure. For those skilled in the art, various features of the embodiments of the disclosure may be changed, substituted, combined and combine in part without departing from the scope of the disclosure. Therefore, the scope of the disclosure is only defined by the attached claims.

Without limitation aspects of the invention may be implemented in a variety of manners including the following.

In one embodiment an electronic device is described that includes processing circuitry configured to establish a first wireless communication channel with a user equipment (UE). The device also determines whether a second communication channel of at least a predetermined quality exists between the UE and a non co-baseband basestation (BS) while the first communication channel between the UE and the electronics device is maintained. The first communication channel and the second communication channel use different carrier resources.

According to one aspect, the processing circuitry is configured to inform the UE on the first communication channel of a determination that the UE is to establish and maintain the second communication channel with the non co-baseband BS while maintaining the first communication channel.

According to another aspect the processing circuitry does not release data communications with the UE on the first communication channel while the UE establishes and maintains data communications with the non co-baseband BS on the second communications channel.

According to another aspect the non co-baseband BS is not connected to the electronic device via an optical connection.

According to another aspect the processing circuitry determines a manner of changing communications with the UE to include establishing and maintaining the second communication channel with the non co-baseband communication channel at least based on a measuring result of signals from the non co-baseband communication channel and the UE.

According to another aspect after the second communication channel is established, the processing circuitry and the non co-baseband BS perform at least one of data transmission of respective control plane configurations, transmission on uplink control channel, and measurements of mobility and wireless link failure.

According to another aspect the electronic device, UE and non co-baseband BS share a common control plane.

According to another aspect the common control plane is a radio resource control (RRC) protocol.

According to another aspect a frequency band used in the first communication channel is different than a frequency band of the second communication channel.

According to another aspect the processing circuitry is configured to receive from the non co-baseband. BS at least one of an indication of which part of message traffic for the UE the non co-baseband BS is able to communicate, a preamble for random access, system information of a new carrier on which the UE communicates with the non co-baseband. BS, and configuration information of control plane protocol for establishing communication between the communication terminal and the second base station.

According to another aspect the processing circuitry performs lossless handover with the non co-baseband. BS by forwarding to a core network sequential data packets and performs data forwarding of a successfully received non-sequential data packet to the non co-baseband BS for subsequent forwarding to the core network.

According to another aspect the processing circuitry performs seamless handover with the non co-baseband BS by acknowledging packets that have been successfully received from the UE so the UE can send dropped packets to the non co-baseband BS for forwarding to a core network.

According to another aspect the processing circuitry performs lossless handover with the non co-baseband BS by acknowledging packets that have been successfully received from the UE so the UE can resend lost packets to the processing circuitry for forwarding to a core network and the UE can also send different packets to the non co-baseband BS so the non co-baseband BS can forward the different packets to the core network.

According to another aspect the processing circuitry performs seamless handover with the non co-baseband BS by acknowledging packets that have been successfully received from the UE for forwarding to a core network so the UE can also send different packets to the non co-baseband BS and the non co-baseband BS can forward the different packets to the core network.

According to another aspect the processing circuitry is configured to stop receiving packets from the UE once the UE recognizes that the processing circuitry has failed to send an acknowledgement for a packet that the UE sent to the processing circuitry.

According to another aspect the processing circuitry in a lossless handover in response to sending a first set of data packets on the first communication channel to the UE and receiving an acknowledge for only a subset of the first set, forwards dropped packets to the non co-baseband BS for relaying to the UE.

According to another aspect the processing circuitry is configured to stop sending packets to the UE once an acknowledge message indicates that a packet was dropped, and in response the processing circuitry forwards at least one packet that was dropped and any newly received packet to the non co-baseband BS for relaying to the UE.

According to another aspect the processing circuitry is configured to forward only the newly received packets to the non co-baseband BS for relaying to the UE.

According to another aspect the processing circuitry is configured to send data packets to the UE from a core network, and once a data end symbol is received, the processing circuitry forwards the data end symbol to the non co-baseband BS for relaying to the UE.

In another embodiment, a communications method is described that establishes a first wireless communication channel between a first basestation and a user equipment (UE); determining with processing circuitry whether a second communication channel of at least predetermined quality exists between the UE and a non co-baseband BS while the first communication channel between the UE and the electronics device is maintained, wherein the first communication channel and the second communication channel use different carrier resources.

In a non-transitory computer readable storage device embodiment, the device has instructions stored therein that when executed by processing circuitry perform a communications method, the method comprising: establishing a first wireless communication channel between a first basestation and a user equipment (UE); determining with the processing circuitry Whether a second communication channel of at least predetermined quality exists between the UE and a non co-baseband BS while the first communication channel between the UE and the electronics device is maintained, wherein the first communication channel and the second communication channel use different carrier resources.

The invention claimed is:

1. A first base station serving user equipment via a first connection, the first base station comprising:
   circuitry configured to
      transmit a dual connection request to a second base station that is non-co-baseband with the first base station for serving the user equipment with a second connection in addition to the first base station, wherein non-co-baseband describes a connection of the first base station and the second base station to a core network through a bone network;
      receive acknowledgement information from the second base station, the acknowledgement information comprising radio resource configuration information of the second base station for establishing communication between the user equipment and the second base station;
      transmit a radio resource control connection reconfiguration message, which includes the radio resource configuration information of the second base station, to the user equipment for establishing the dual connection; and
      receive continuously, from the core network, new data to be transmitted from the second base station to the user equipment and transfer the new data to the second base station when a quality of communication between the second base station and the core network is poorer than a quality of communication between the first base station and the core network, wherein
   the user equipment establishes and maintains the second connection with the second base station and maintains the first connection with the first base station after completing establishment of the dual connection, and
   the user equipment receives the new data from the second base station.

2. The first base station according to claim 1, wherein after the dual connection is established, the first base station maintains intra-site carrier aggregation communication with the user equipment on first multiple carriers comprising a primary carrier and a secondary carrier of the first base station, and the user equipment communicates with the second base station on second multiple carriers comprising a primary carrier and a secondary carrier of the second base station, the primary carrier of the second base station is responsible for transmission of uplink control channel and is independent from the primary carrier of the first base station.

3. The first base station according to claim 1, wherein the acknowledgement information further comprises a specific part of service to the user equipment that the second base station is admitted to bear.

4. The first base station according to claim 3, wherein the new data to be transmitted from the second base station to the user equipment belongs to the specific part of service.

5. The first base station according to claim 2, wherein the radio resource configuration information of the second base station includes system information of the primary carrier and the secondary carrier of the second base station.

6. The first base station according to claim 1, wherein the first base station is in charge of carrier addition to the user equipment.

7. The first base station according to claim 1, wherein the circuitry communicates with the second base station via an X2 interface.

8. The first base station according to claim 1, wherein
   the circuitry communicates with the core network via an S1 interface, and
   the core network corresponds to an evolved packet core network.

9. A user equipment served by a first base station via a first connection, the user equipment comprising:
   circuitry configured to
      measure a measurement result that indicates a channel quality between the user equipment and a second base station which is non-co-baseband with the first base station, wherein non-co-baseband describes a connection of the first base station and the second base station to a core network through a bone network;
      report, according to a predetermined condition, the measurement result to the first base station for deciding addition of the second base station to the user equipment for dual connection together with the first base station;
      receive, via the first base station, a radio resource control connection reconfiguration message including radio resource configuration information of the second base station for establishing the dual connection;
      access to the second base station based on the radio resource control connection reconfiguration message; and
      receive, from the second base station, new data which is continuously transferred by the first base station to the second base station from the core network when a quality of communication between the second base station and the core network is poorer than a quality of communication between the first base station and the core network, wherein
   the circuitry establishes and maintains the second connection with the second base station and maintains the first connection with the first base station after completing establishment of the dual connection.

10. The user equipment according to claim 9, wherein after the dual connection is established, the circuitry maintains intra-site carrier aggregation communication with the first base station on first multiple carriers comprising a primary carrier and a secondary carrier of the first base station, and the circuitry communicates with the second base station on second multiple carriers comprising a primary carrier and a secondary carrier of the second base station, the primary carrier of the second base station is responsible for transmission of uplink control channel and is independent from the primary carrier of the first base station.

11. The user equipment according to claim 9, wherein the new data received from the second base station belongs to a specific part of service to the user equipment that the second base station is admitted to bear.

12. The user equipment according to claim 10, wherein the radio resource configuration information of the second base station includes system information of the primary carrier and the secondary carrier of the second base station.

13. The user equipment according to claim 9, wherein the first base station is in charge of carrier addition to the user equipment.

14. A second base station in a communication network, the second base station comprising:
circuitry configured to
receive a dual connection request from a first base station that is non-co-baseband with the second base station for serving a user equipment with a second connection in addition to the first base station, wherein non-co-baseband describes a connection of the first base station and the second base station to a core network through a bone network;
transmit acknowledgement information to the first base station, the acknowledgement information comprising radio resource configuration information of the second base station for establishing communication between the user equipment and the second base station; and
receive continuously new data from the first base station and transmit the new data to the user equipment when a quality of communication between the second base station and the core network is poorer than a quality of communication between the first base station and the core network, wherein
the user equipment establishes and maintains the second connection with the second base station and maintains the first connection with the first base station after completing establishment of the dual connection.

15. The second base station according to claim 14, wherein after the dual connection is established, the first base station maintains intra-site carrier aggregation communication with the user equipment on first multiple carriers comprising a primary carrier and a secondary carrier of the first base station, and the second base station communicates with the user equipment on second multiple carriers comprising a primary carrier and a secondary carrier of the second base station, the primary carrier of the second base station is responsible for transmission of uplink control channel and is independent from the primary carrier of the first base station.

16. The second base station according to claim 14, wherein the acknowledgement information further comprises a specific part of service to the user equipment that the second base station is admitted to bear.

17. The second base station according to claim 16, wherein the new data to be transmitted from the second base station to the user equipment belongs to the specific part of service.

18. The second base station according to claim 14, wherein the second base station is a small base station.

19. A communication method in a communication system that includes a first base station and a second base station, the first base station serving a user equipment via a first connection, the communication method comprising:
transmitting, by the first base station, a dual connection request to the second base station, the second base station being non-co-baseband with the first base station for serving the user equipment with a second connection in addition to the first base station, and non-co-baseband describing a connection of the first base station and the second base station to a core network through a bone network;
transmitting, by the second base station, acknowledgement information comprising radio resource configuration information of the second base station for establishing communication between the user equipment and the second base station;
receiving, by the first base station, the acknowledgement information from the second base station;
transmitting, by the first base station, a radio resource control connection reconfiguration message, which includes the radio resource configuration information of the second base station, to the user equipment for establishing the dual connection;
continuously receiving, by the first base station from the core network, new data to be transmitted from the second base station to the user equipment and transferring the new data to the second base station when a quality of communication between the second base station and the core network is poorer than a quality of communication between the first base station and the core network; and
continuously transmitting, by the second base station, the new data to the user equipment, wherein
the user equipment establishes and maintains the second connection with the second base station and maintains the first connection with the first base station after completing establishment of the dual connection.

20. The method according to claim 19, wherein after the dual connection is established, the first base station maintains intra-site carrier aggregation communication with the user equipment on first multiple carriers comprising a primary carrier and a secondary carrier of the first base station, and the user equipment communicates with the second base station on second multiple carriers comprising a primary carrier and a secondary carrier of the second base station, the primary carrier of the second base station is responsible for transmission of uplink control channel and is independent from the primary carrier of the first base station.

* * * * *